United States Patent
Kakimoto

(10) Patent No.: US 10,933,832 B2
(45) Date of Patent: Mar. 2, 2021

(54) HEAD PROTECTION AIRBAG DEVICE

(71) Applicant: TOYODA GOSEI CO., LTD., Kiyosu (JP)

(72) Inventor: Kenji Kakimoto, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 35 days.

(21) Appl. No.: 16/439,849

(22) Filed: Jun. 13, 2019

(65) Prior Publication Data

US 2019/0389415 A1    Dec. 26, 2019

(30) Foreign Application Priority Data

Jun. 25, 2018 (JP) .............................. JP2018-120181

(51) Int. Cl.
| | |
|---|---|
| B60R 21/20 | (2011.01) |
| B60R 21/21 | (2011.01) |
| B60R 21/237 | (2006.01) |
| B60R 21/235 | (2006.01) |
| B60R 21/00 | (2006.01) |
| B60R 21/26 | (2011.01) |

(52) U.S. Cl.
CPC ............ B60R 21/21 (2013.01); B60R 21/237 (2013.01); *B60R 2021/0048* (2013.01); *B60R 2021/23519* (2013.01); *B60R 2021/26076* (2013.01)

(58) Field of Classification Search
CPC . B60R 21/232; B60R 21/235; B60R 21/2338; B60R 21/213; B60R 2021/23382; B60R 2021/23547

USPC ............................................ 280/728.2, 730.2
See application file for complete search history.

(56) References Cited

U.S. PATENT DOCUMENTS

| | | | |
|---|---|---|---|
| 2006/0255568 A1* | 11/2006 | Demel | B60R 21/201 280/728.2 |
| 2015/0291119 A1* | 10/2015 | Noma | B60R 21/201 280/728.2 |
| 2017/0247009 A1* | 8/2017 | Konaka | B60R 21/232 |
| 2018/0015900 A1* | 1/2018 | Hirayama | B60R 21/213 |
| 2019/0001912 A1* | 1/2019 | Sato | B62D 65/14 |

FOREIGN PATENT DOCUMENTS

| | | |
|---|---|---|
| JP | 2011-068276 A | 4/2011 |
| JP | 2015-105036 A | 6/2015 |

* cited by examiner

*Primary Examiner* — Toan C To
(74) *Attorney, Agent, or Firm* — Posz Law Group, PLC

(57) ABSTRACT

A head protection airbag device includes: an airbag configured to cover a window of a vehicle; and a synthetic resin case configured to store a folding completed body of the airbag. The case includes a case body, and a pressing piece formed to partially protrude downward from an upper edge side of the case body and formed to cover a vehicle inner side of the folding completed body. The pressing piece has a band-like outer shape having a width direction substantially along a front and rear direction, and is configured to be able to press the folding completed body toward the case body so that the pressing piece can be bent with respect to the case body and the pressing piece can maintain a folded shape of the folding completed body, the pressing piece formed substantially along a vehicle interior surface of the folding completed body.

2 Claims, 8 Drawing Sheets

HEAD PROTECTION AIRBAG DEVICE

CROSS-REFERENCE TO RELATED APPLICATIONS

This application is based upon and claims the benefit of priority from prior Japanese patent application No. 2018-120181, filed on Jun. 25, 2018, the entire contents of which are incorporated herein by reference.

TECHNICAL FIELD

The present invention relates to a head protection airbag device which is mounted on a vehicle in a state where an airbag covering a window of a vehicle at the time of deployment and inflation is folded and stored in a synthetic resin case.

BACKGROUND ART

There is available that a head protection airbag device in which a folding completed body is stored in a case in a state where a fastening band capable of preventing a folding collapse and releasing a winding state at the time of deployment and inflation of an airbag is wound around the folding completed body (e.g., see JP-A-2015-105036).

In this related-art head protection airbag device, the folding completed body is stored in a case in a state where the folding collapse is prevented by winding the fastening band around the folding completed body and locking a leading end of the fastening band into a predetermined locking hole. Therefore, there is room for improvement in suppressing an increase in the number of parts and the number of operation steps.

The present invention has been made to solve the above-described problem and an object thereof is to provide a head protection airbag device capable of suppressing an increase in the number of parts and the number of operation steps even when it is mounted on a vehicle in a state of being stored in a case.

SUMMARY OF INVENTION

According to an aspect of the invention, there is provided a head protection airbag device comprising: an airbag configured to cover a window of a vehicle at a time of deployment and inflation, and folded and stored at an upper edge side of the window on a vehicle inner side; and a synthetic resin case configured to store a folding completed body of the airbag which is folded so that a lower edge side at a time of completion of inflation comes close to an upper edge side, wherein the case includes a case body configured to cover the folding completed body at least from a vehicle outer side to an upper surface side, and a pressing piece formed to partially protrude downward from an upper edge side of the case body and formed to cover a vehicle inner side of the folding completed body, and the pressing piece has a band-like outer shape having a width direction substantially along a front and rear direction, and is configured to be able to press the folding completed body toward the case body so that the pressing piece can be bent with respect to the case body and the pressing piece can maintain a folded shape of the folding completed body, the pressing piece being formed substantially along a vehicle interior surface of the folding completed body.

DESCRIPTION OF EMBODIMENTS

Figure 1:
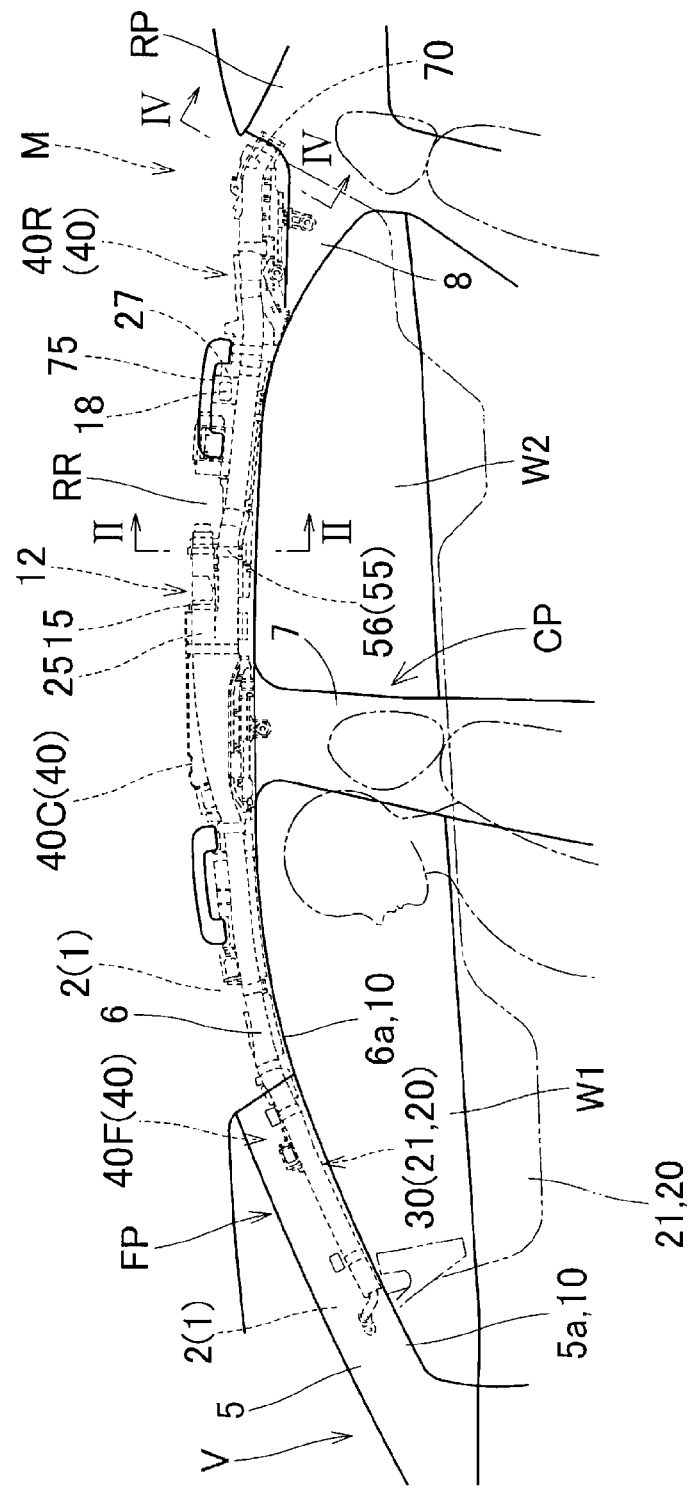
FIG. 1 is a schematic front view of a head protection airbag device according to a first embodiment of the present invention, as viewed from the vehicle inner side.

Hereinafter, an embodiment of the present invention will be described with reference to the drawings. As shown in FIG. 1, a head protection airbag device M according to the embodiment is configured so that an airbag 20 is folded and stored in a range from a peripheral edge on the upper edge side of windows (side windows) W1, W2 of a vehicle V, that is, a front pillar portion FP to the vicinity of the upper portion of a rear pillar portion RP via a roof side rail portion RR so as to cover the windows W1, W2 of the vehicle V at the time of completion of inflation. Meanwhile, in the case of the present embodiment, the vehicle V is configured such that one center pillar portion CP disposed substantially along an upper and lower direction is arranged between the front pillar portion FP and the rear pillar portion RP and the airbag 20 at the time of completion of inflation covers the vehicle inner side of portions of an intermediate pillar garnish 7 disposed in the center pillar portion CP and a rear pillar garnish 8 disposed in the rear pillar portion RP together with the windows W1, W2, as indicated by the two-dot chain line in FIG. 1.

Meanwhile, in the embodiment, unless stated otherwise, the upper and lower direction and the front and rear direction will be described in agreement with the upper and lower direction and the front and rear direction of the vehicle V when mounted on the vehicle.

As shown in FIG. 1, the head protection airbag device M includes the airbag 20, an inflator 12 for supplying an inflation gas to the airbag 20, and a case 40 for storing the folded airbag 20 (the folding completed body 30). When mounted on the vehicle V, the folding completed body 30, the inflator 12, and the case 40 are stored in a state where a vehicle inner side I thereof is covered by an airbag cover 10 (see FIGS. 2 and 3). The airbag cover 10 has a lower edge 5a of a front pillar garnish 5 covering the vehicle inner side of the front pillar portion FP and a lower edge 6a of a roof head lining 6 covering the vehicle inner side of the roof side rail portion RR.

Together with the intermediate pillar garnish 7 and the rear pillar garnish 8, the front pillar garnish 5 and the roof head lining 6 are made of synthetic resin and mounted to the vehicle inner side I of an inner panel 2 which is a member on the side of a body 1 in the front pillar portion FP and the roof side rail portion RR by a mounting means (not shown). Further, the airbag cover 10 having these lower edges 5*a*, 6*a* is configured so that the airbag 20 at the time of deployment and inflation can protrude therefrom and the lower edges 5*a*, 6*a* are opened to the vehicle inner side I by being pushed by the airbag (see FIG. 2).

The inflator 12 is configured to supply an inflation gas to the airbag 20. As shown in FIG. 1, the inflator 12 is a cylinder type having a substantially columnar shape and a gas discharge port (not shown) thereof capable of discharging the inflation gas is disposed on the leading end side. The leading end side of the inflator 12 including the gas discharge port is connected to a connection port portion 25 of the airbag 20 using a clamp 15. Further, although detailed illustration is omitted, the inflator 12 is attached to the inner panel 2 using a mounting bracket and a bolt.

The airbag 20 is deployed from the folded state by the inflow of the inflation gas from the inflator 12 and is deployed and inflated to cover the vehicle inner side of the windows W1, W2 and the vehicle inner side of the intermediate pillar garnish 7 and the rear pillar garnish 8 in the center pillar portion CP and the rear pillar portion RP, as indicated by the two-dot chain line in FIG. 1. The airbag 20 includes a bag body 21 which has a substantially rectangular plate shape at the time of completion of inflation, a mounting piece 27 which mounts an upper edge 21*a* of the bag body 21 to the inner panel 2 on the side of the body 1 at a plurality of locations along the front and rear direction, and the connection port portion 25 protruding from the upper edge 21*a* of the bag body 21 and connected to the inflator 12. The mounting piece 27 is attached to the inner panel 2 on the side of the body 1 using a mounting clip 18 together with a mounting seat 75 of the case 40 (to be descried later) (see FIG. 1). As described above, the connection port portion 25 is connected to the inflator 12. Further, the airbag 20 is mounted on the vehicle V in such a manner that the bag body 21 is folded from a flat deployed state to allow its lower edge 21*b* to come close to its upper edge 21*a* and the folding completed body 30 formed by being folded in this manner is stored in the case 40. Specifically, the bag body 21 is folded by folding the portion on the side of the upper edge 21*a* in a bellows manner and winding the portion on the lower side from the side of the lower edge 21*b* toward the vehicle outer side in a roll folding manner. As shown in FIGS. 2, 3, 9A and 9B, the folding completed body 30 formed by folding the bag body 21 has a configuration in which a bellows-folded portion 30*a* is placed on the upper side of a roll-folded portion 30*b*, and has a substantially circular sectional shape.

The case 40 for storing the folded airbag 20 (the folding completed body 30) is made of thermoplastic elastomer. In the embodiment, the case 40 is formed of polyolefin-based thermoplastic elastomer (TPO). The case 40 is elongated in the front and rear direction. In the head protection airbag device M according to the embodiment, as shown in FIG. 1, three cases are used. Specifically, a case 40F for storing a region on the front end side of the folding completed body 30, a case 40C for storing a region near the connection port portion 25, and a case 40R for storing a region on the rear side of the connection port portion 25 are used. In the embodiment, the case 40R disposed on the rear side will be described in detail as an example. A pressing piece 70 (to be described later) is not formed in the cases 40F, 40C. However, the cases 40F, 40C are configured to store the folding completed body 30 therein using a winding band 55 or a tape material or the like. Further, the cases 40F, 40C have the same configuration as that of the case 40R except for the above point and the difference in the outer shape. Meanwhile, the case 40 is disposed around the folding completed body 30 so as to protect the folded airbag 20 (the folding completed body 30) during transport, when mounted on a vehicle or during inflation or the like, to serve as a protector for guiding the deployment direction at the time of inflation, and to cover the folding completed body 30 from the surrounding interference.

As shown in FIGS. 4 to 8, the case 40R includes a case body 41 for storing the folding completed body 30, the winding band 55 wound around the folding completed body 30 stored in the case body 41, the pressing piece 70 partially protruding downward from the case body 41 and covering the vehicle inner side of the folding completed body 30, and the mounting seat 75 mounted to the inner panel 2 on the side of the body 1.

Figure 2:
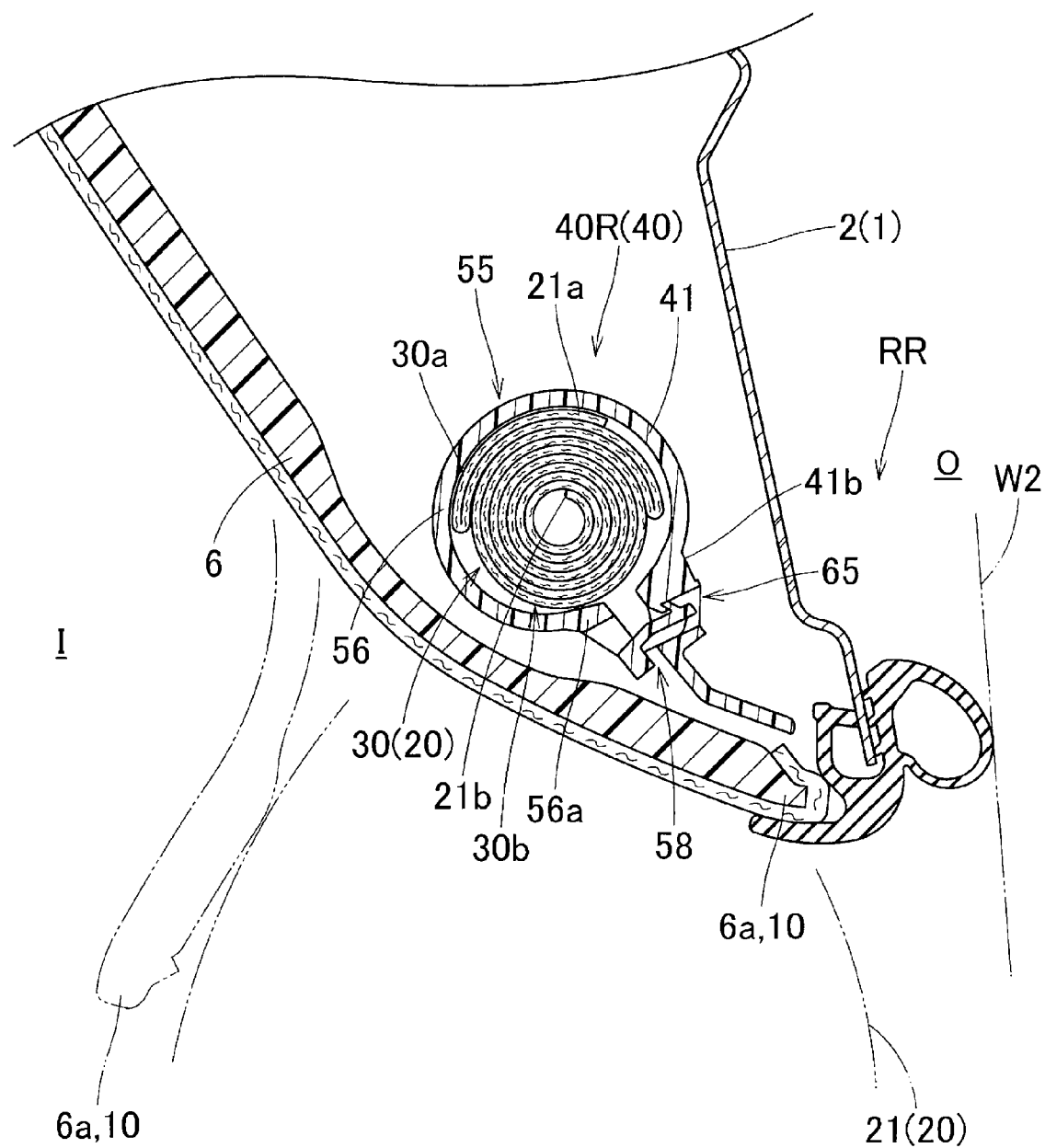
FIG. 2 is a longitudinal sectional view of the head protection airbag device according to the embodiment in a state of being mounted on a vehicle, corresponding to the portion II-II of FIG. 1.
Figure 3:
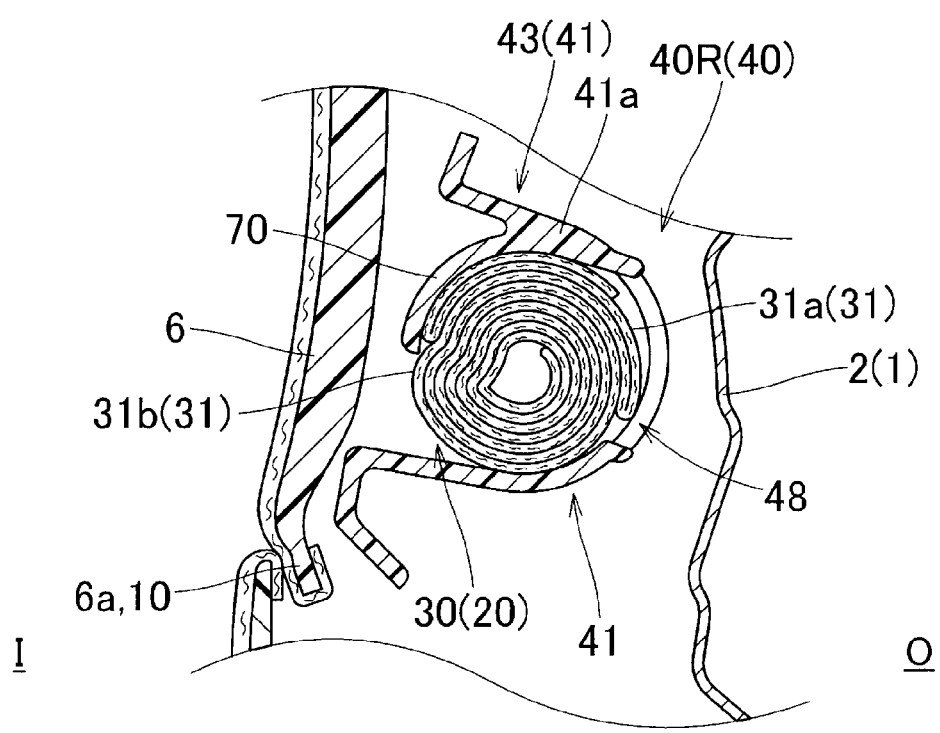
FIG. 3 is a longitudinal sectional view of the head protection airbag device according to the embodiment in a state of being mounted on the vehicle, corresponding to the portion III-III of FIG. 1.

The case body 41 is formed to be curved in a substantially arc shape along an outer peripheral surface of the folding completed body 30 so as to cover the folding completed body 30 at least from the vehicle outer side to the upper surface side (see FIGS. 2 and 3).

Figure 4:
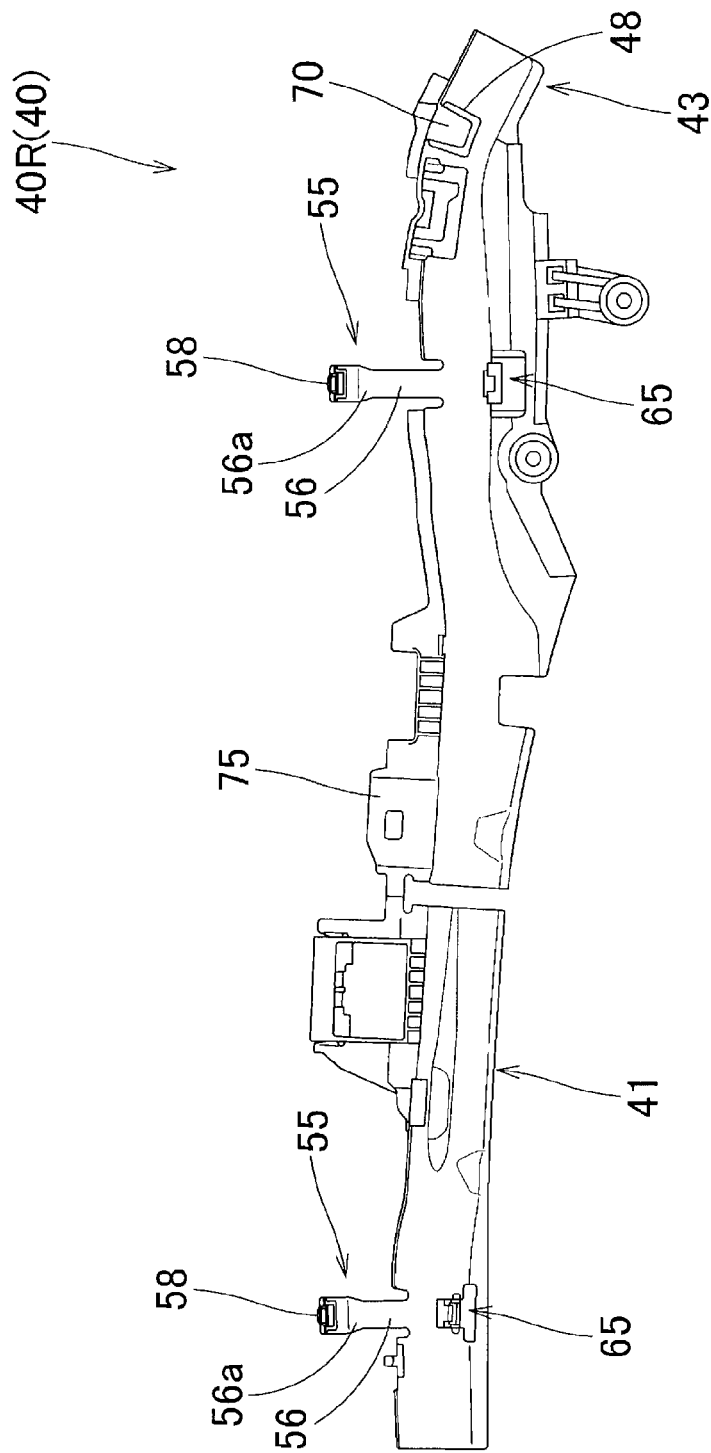
FIG. 4 is a schematic front view of a case used in the head protection airbag device according to the embodiment.

In the case of the embodiment, as shown in FIG. 4, the winding band 55 is formed at two locations, that is, a location on the front end side of the case body 41 and a location on the rear side of the case body 41 and between the pressing piece 70 and the mounting seat 7. As shown in FIGS. 2 and 4, the winding band 55 has a substantially strip-like band body 56 extending from an upper edge 41*a* of the case body 41, a locking portion 58 disposed on the side of a leading end 56*a* of the band body 56, and a locked portion 65 formed on the side of the case body 41 for inserting and locking the locking portion 58.

Figure 5:
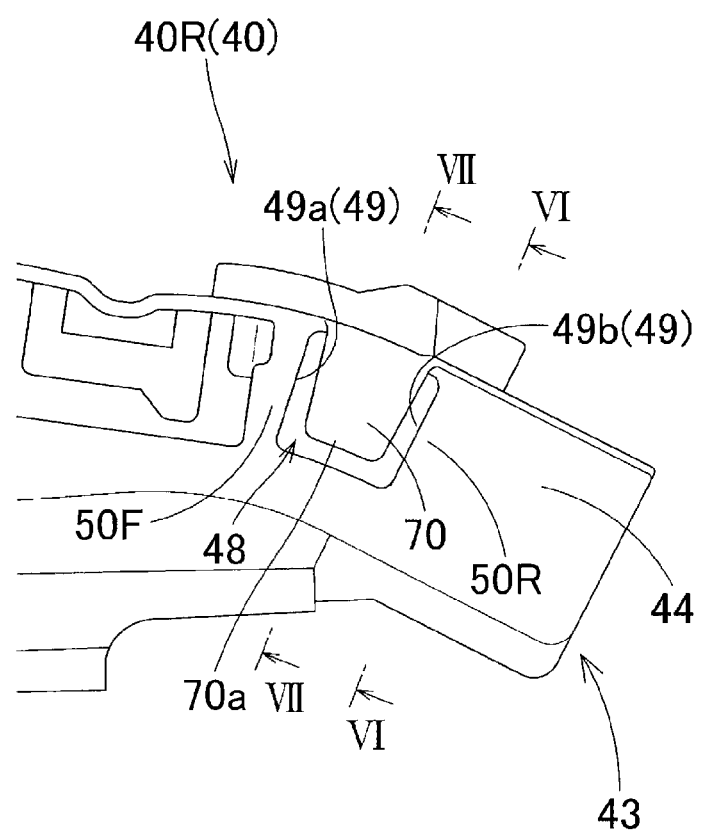
FIG. 5 is a partially enlarged front view showing a rear end side portion of the case in FIG. 4.
Figure 6:
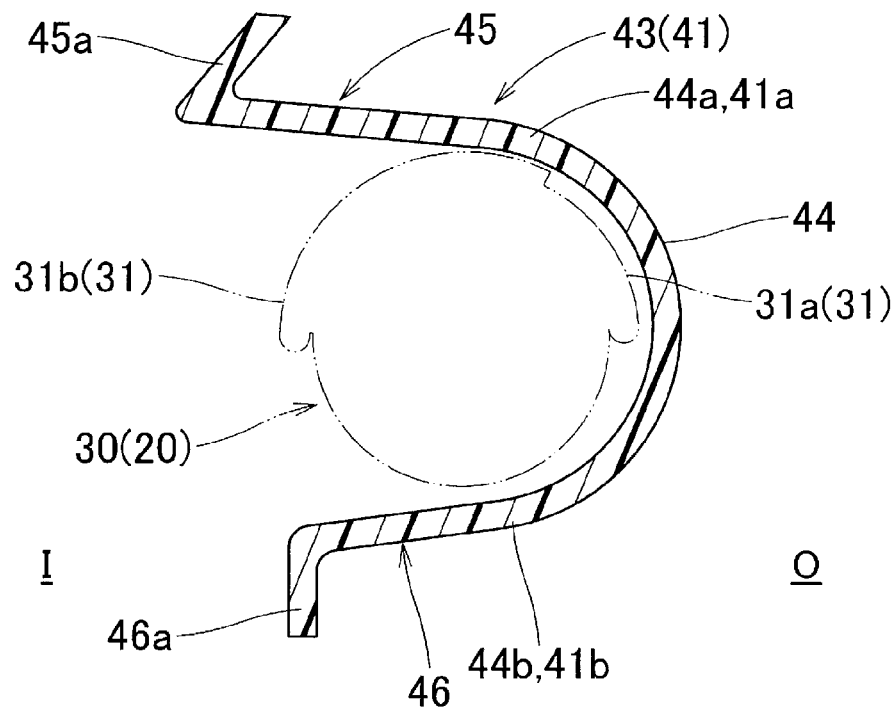
FIG. 6 is an end view taken along the portion VI-VI of FIG. 5.

In the case of the embodiment, as shown in FIGS. 3 to 5, the pressing piece 70 is formed at a rear end portion 43 constituting a region on the rear end side of the case body 41. As shown in FIG. 6, the rear end portion 43 of the case body 41 in which the pressing piece 70 is disposed covers a vehicle outer side O of the folding completed body 30 over a substantially half circumference and has an upper end and a lower end respectively protruding to the vehicle inner side I than the folding completed body 30. That is, the rear end portion 43 has a vehicle exterior portion 44 having a substantially semicircular arc shape and covering the vehicle outer side O of the folding completed body 30, an upper wall portion 45 extending from an upper end 44*a* of the vehicle exterior portion 44 toward the vehicle inner side I, and a lower wall portion 46 extending from a lower end 44*b* of the vehicle exterior portion 44 toward the vehicle inner side I. Further, on the upper wall portion 45 and the lower wall portion 46, rib portions 45*a*, 46*a* are respectively formed to be bent so that leading ends thereof are directed upward or downward.

Figure 7:
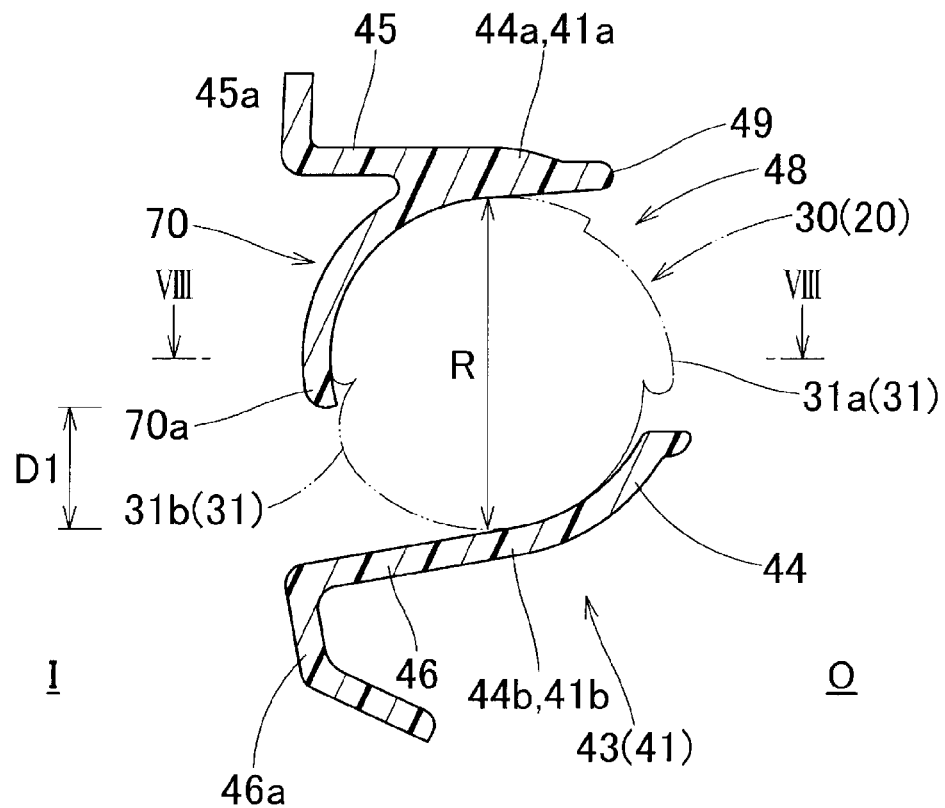
FIG. 7 is an end view taken along the portion VII-VII of FIG. 5.

The pressing piece 70 is formed to partially protrude downward from the upper end 44*a* of the vehicle exterior portion 44 on the side of the upper edge 41*a* of the case body 41. As shown in FIG. 5, the pressing piece 70 has a band-like outer shape having a width direction substantially along the front and rear direction. Further, as shown in FIG. 7, the sectional shape in a direction orthogonal to an axis of the folding completed body 30 is a substantially arc shape extending substantially along a vehicle interior surface 31*b* of the folding completed body 30. Specifically, the sectional shape of the pressing piece 70 is an approximately ¼ arc shape and a lower end 70a of the pressing piece 70 is disposed at a position approximately at the center in the upper and lower direction of the vehicle exterior portion 44. In other words, the pressing piece 70 is configured so that a separation distance (gap) D1 between the lower end 70a and the lower end 44b (the case body 41) of the vehicle exterior portion 44 is set to about ½ of a diameter dimension R of the folding completed body 30 (see FIG. 7). Preferably, this separation distance D1 is equal to or less than ½ of the diameter dimension R of the folding completed body 30. Specifically, it is preferable to set the ratio of the separation distance D1 to the diameter dimension R in the range of about ½ to ⅓. When the separation distance D1 is larger than ½ of the diameter dimension R, there is a possibility that the folding completed body 30 cannot be stably held by the pressing piece 70. Further, when the separation distance D1 is less than ⅓ of the diameter dimension R, it is not easy to store the folding completed body 30 in the case body 41 by bending the pressing piece 70. Meanwhile, when the separation distance D1 is equal to or larger than ¾ of the diameter dimension R, the folding completed body 30 cannot be held by the pressing piece 70. The pressing piece 70 is configured to be able to press the folding completed body 30 toward the case body 41 (the rear end portion 43) so that it can be bent with respect to the case body 41 (the rear end portion 43) and it can maintain the folded shape of the folding completed body 30. In the case of the embodiment, the pressing piece 70 is configured to be slightly pressed against the folding completed body 30 in a state where the folding completed body 30 is stored in the case body 41 (see FIGS. 7, 8 and 9B).

Figure 8:
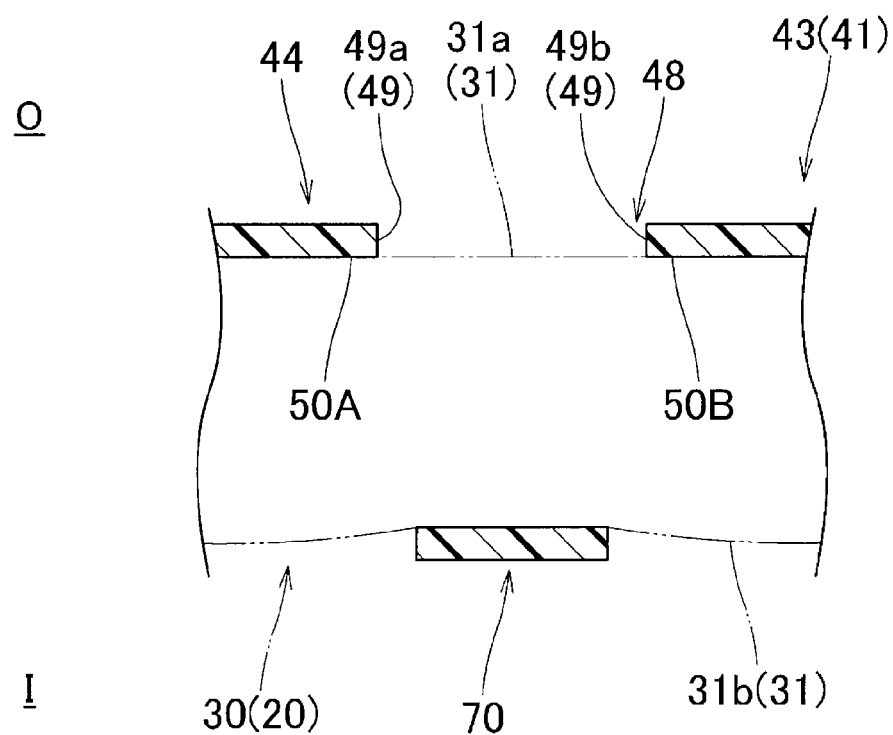
FIG. 8 is an end view taken along the portion VIII-VIII of FIG. 7.

Further, as shown in FIGS. 5, 7 and 8, a drain hole 48 for molding is formed in the vehicle exterior portion 44 disposed on the vehicle outer side O of the pressing piece 70 in the rear end portion 43 of the case body 41. As shown in FIG. 5, a width dimension in the upper and lower direction and the front and rear direction of the drain hole 48 is larger than that of the pressing piece 70, when viewing the case 40R from the inside and outside of the vehicle. A core for forming an inner peripheral surface of the pressing piece 70 is inserted through the drain hole 48. Further, when the folding completed body 30 is stored in the case body 41, inner surfaces of the vehicle exterior portion 44 on the side of a front edge 49a and on the side of a rear edge 49b in a peripheral edge 49 of the drain hole 48 constitute support surfaces 50F, 50R capable of supporting the folding completed body 30 (see FIG. 8). That is, in the embodiment, the folding completed body 30 is stored in the case body 41 and is in a state where the pressing piece 70 is pressed against the vehicle interior surface 31b of an outer peripheral surface 31. In this state, regions of an opposing vehicle exterior surface 31a forming the front and rear regions of the pressing piece 70 are pressed against the support surfaces 50F, 50R configured by the front edge 49a and the rear edge 49b of the drain hole 48. In other words, the folding completed body 30 is stored in the case body 41 so as to be supported from both sides in the vehicle inside and outside direction at three points spaced in the front and rear direction.

The mounting seat 75 is disposed at a position corresponding to the mounting piece 27 for mounting the upper edge 21a of the airbag 20 to the inner panel 2 on the body side. In the case 40R according to the embodiment, the mounting seat 75 is formed at one location slightly forward of the center in the front and rear direction (see FIG. 4). Although detailed illustration is omitted, the mounting seat 75 is attached to the inner panel 2 using the mounting clip 18 together with the mounting piece 27.

Next, the mounting of the head protection airbag device M according to the embodiment on the vehicle V will be described. First, as described above, the airbag 20 is folded from the flat deployed state through a roll folding and a bellows folding to form the folding completed body 30. After the folding completed body 30 is formed, the surroundings of a plurality of places on the front and rear direction side are wrapped with a tape-like wrapping material (not shown) capable of preventing a folding collapse and breaking at the time of inflation.

Figure 9A:
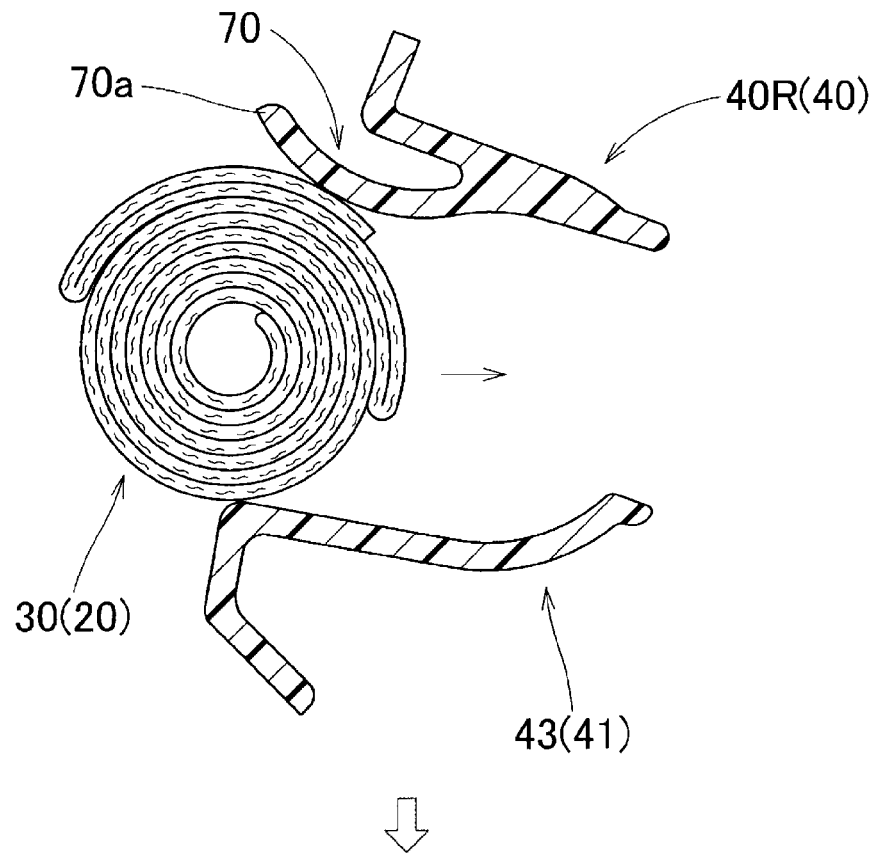
FIGS. 9A and 9B are partially enlarged longitudinal sectional views showing a process of storing a folding completed body in the case while bending a pressing piece.
Figure 9B:
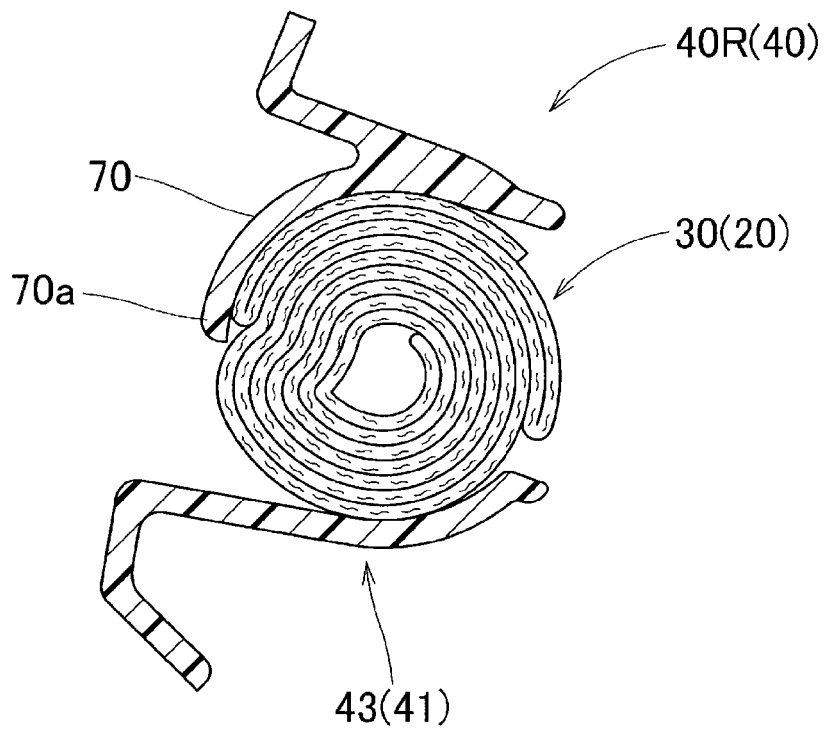

Then, the folding completed body 30 is stored in the case 40. At this time, in the rear end portion 43 of the case body 41, the pressing piece 70 is bent so that the lower end 70a is separated from the case body 41, and the folding completed body 30 is stored in the rear end portion 43 from a gap between the lower end 70a and the case body 41. In this manner, the folding completed body 30 is stored in the case body 41 (see FIG. 9A). At this time, when the pressing piece 70 is released after the folding completed body 30 is stored in the rear end portion 43, the pressing piece 70 is restored and disposed to press the vehicle interior surface 31b of the folding completed body 30, as shown in FIG. 9B. Further, although detailed illustration is omitted, the mounting clip 18 is temporarily fixed to the mounting seat 75 in a state where the mounting piece 27 is superimposed on the vehicle inner side of the mounting seat 75. Furthermore, the band body 56 of the winding band 55 is wound around the folding completed body 30. The locking portion 58 disposed on the side of the leading end 56a of the band body 56 is locked by being inserted into the locked portion 65 and is wrapped by the band body 56 of the winding band 55. In addition, the inflator 12 to which a mounting bracket (not shown) is attached is inserted into the connection port portion 25 of the airbag 20 protruding from the folding completed body 30. The connection port portion 25 and the inflator 12 are connected by the clamp 15, and the mounting clip 18 is temporarily fixed to the mounting piece 27 and the mounting seat 75. In this manner, an airbag assembly can be formed. Further, the mounting piece 27 and the mounting seat 75 are attached to the inner panel 2 on the side of the body 1 using the mounting clip 18, and simultaneously, the inflator 12 is fixed to a predetermined position of the inner panel 2. In this manner, the airbag assembly can be assembled to the vehicle V. Then, a lead wire (not shown) extending from a control device for actuating the inflator is connected to the inflator 12, and the front pillar garnish 5, the roof head lining 6, the intermediate pillar garnish 7, and the rear pillar garnish 8 are attached to the inner panel 2 on the side of the body 1. In this manner, the head protection airbag device M can be mounted on the vehicle V.

When the inflator 12 is activated in response to an activation signal from the control device after the head protection airbag device M is mounted on the vehicle V, inflation gas discharged from the inflator 12 flows into the airbag 20, and the inflating bag body 21 breaks the wrapping material. Further, the bag body 21 pushes and opens the airbag cover 10 while releasing the locked state between the locking portion 58 and the locked portion 65 in the winding band 55. Then, the bag body 21 is deployed while protruding downward. Further, as indicated by the two-dot chain line in FIG. 1, the bag body 21 completes inflation to cover the vehicle inner side of the windows W1, W2 and the vehicle inner side of the center pillar portion CP and the rear pillar portion RP.

Further, in the head protection airbag device M according to the embodiment, the case 40R includes the pressing piece 70 formed to partially protrude from the case body 41 itself and covering the vehicle inner side I of the folding completed body 30. With such a configuration, when the folding completed body 30 is stored in the case body 41 by bending the pressing piece 70, the folding completed body 30 can be pressed toward the case body 41 by the restoring pressing piece 70. In this manner, the folding completed body 30 can be stored in the case 40R while preventing a folding collapse in a state where the folding shape thereof is maintained. That is, in the head protection airbag device M according to the embodiment, the folding completed body 30 can be stored in the case 40R while preventing occurrence of a folding collapse even without separately placing a member for preventing the folding collapse of the folding completed body 30 in the region where the pressing piece 70 is disposed. Therefore, a member for preventing the folding collapse is not necessary, and the number of parts and the number of operation steps can be reduced, as compared with the case where the pressing piece is not provided.

Therefore, in the head protection airbag device M according to the embodiment, it is possible to suppress an increase in the number of parts and the number of operation steps even in the configuration in which the head protection airbag device M is mounted on the vehicle V in a state of being stored in the case 40.

In the head protection airbag device M according to the embodiment, the pressing piece 70 is formed at only one place on the rear end side of the case 40R, and the case 40R has two winding bands 55 as a means for holding the folding completed body 30 in the case body 41. The winding band can also be changed to a pressing piece. When two winding bands are changed to a pressing piece, the operation of storing the folding completed body in the case is further simplified.

Further, in the head protection airbag device M according to the embodiment, the drain hole 48 for molding is formed in the region (the vehicle exterior portion 44 of the rear end portion 43) of the case body 41 disposed on the vehicle outer side of the pressing piece 70, and the front edge 49a and the rear edge 49b of the peripheral edge 49 of the drain hole 48 are configured as the support surfaces 50F, 50R capable of supporting the folding completed body 30. Therefore, in the head protection airbag device M according to the embodiment, the drain hole 48 for molding is provided, so that the case 40R can be manufactured without complicating the structure of a manufacturing mold even in the configuration having the pressing piece 70. In this way, the case 40R can be more cheaply manufactured while suppressing an increase in manufacturing cost. Further, even in the configuration having the drain hole 48, the folding completed body 30 stored in the case body 41 can be held by the support surfaces 50F, 50R formed by the front edge 49a and the rear edge 49b of the peripheral edge 49 of the drain hole 48 and the pressing piece 70 over a wide range along the front and rear direction from both sides in the vehicle inside and outside direction. In this manner, the folding completed body 30 can be stably stored in the case 40 while preventing a folding collapse.

Furthermore, in the head protection airbag device M according to the embodiment, the pressing piece 70 is configured so that the separation distance D1 between the lower end 70a and the case body 41 is set to about ½ of the diameter dimension R of the folding completed body 30. The gap between the lower end 70a of the pressing piece 70 and the case body 41 is small, and the folding completed body 30 can be properly prevented from protruding from the gap. In this manner, the folding collapse of the folding completed body 30 can be further stably prevented.

Meanwhile, in the head protection airbag device M according to the embodiment, the pressing piece 70 formed in the case 40R is configured to be able to press the region near the rear end (terminal) of the folding completed body 30. Therefore, the terminal of the folding completed body 30 can be transversely slid and stored in the case body 41, and the workability of storing the folding completed body 30 in the case 40R is good. Further, even if the pressing force by the pressing piece 70 is strong, the pressing piece 70 can deploy the airbag 20 at the time of deployment and inflation from the gap between the pressing piece 70 and the case body 41 without any problem because the pressing piece 70 is disposed on the rear end side of the folding completed body 30.

According to an aspect of the invention, there is provided a head protection airbag device comprising: an airbag configured to cover a window of a vehicle at a time of deployment and inflation, and folded and stored at an upper edge side of the window on a vehicle inner side; and a synthetic resin case configured to store a folding completed body of the airbag which is folded so that a lower edge side at a time of completion of inflation comes close to an upper edge side, wherein the case includes a case body configured to cover the folding completed body at least from a vehicle outer side to an upper surface side, and a pressing piece formed to partially protrude downward from an upper edge side of the case body and formed to cover a vehicle inner side of the folding completed body, and the pressing piece has a band-like outer shape having a width direction substantially along a front and rear direction, and is configured to be able to press the folding completed body toward the case body so that the pressing piece can be bent with respect to the case body and the pressing piece can maintain a folded shape of the folding completed body, the pressing piece being formed substantially along a vehicle interior surface of the folding completed body.

In the head protection airbag device of the present invention, the case includes the pressing piece formed to partially protrude from the case body itself and covering the vehicle inner side of the folding completed body. With such a configuration, when the folding completed body is stored in the case body by bending the pressing piece, the folding completed body can be pressed toward the case body by the restoring pressing piece. In this manner, the folding completed body can be stored in the case while preventing a folding collapse in a state where the folding shape thereof is maintained. That is, in the head protection airbag device of the present invention, the folding completed body can be stored in the case while preventing occurrence of a folding collapse even without separately placing a member for preventing the folding collapse of the folding completed body in the region where the pressing piece is disposed. Therefore, a member for preventing the folding collapse is not necessary, and the number of parts and the number of operation steps can be reduced, as compared with the case where the pressing piece is not provided.

Therefore, in the head protection airbag device M of the present invention, it is possible to suppress an increase in the number of parts and the number of operation steps even in the configuration in which the head protection airbag device is mounted on the vehicle in a state of being stored in the case.

A drain hole for molding may be formed in a region of the pressing piece disposed on a vehicle outer side in the case body, and a front edge side and a rear edge side of a peripheral edge of the drain hole may constitute support surfaces capable of supporting the folding completed body.

According to the head protection airbag device having such a configuration, the drain hole for molding is provided, so that the case can be manufactured without complicating the structure of a manufacturing mold even in the configuration having the pressing piece. In this way, the case can be more cheaply manufactured while suppressing an increase in manufacturing cost. Further, even in the configuration having the drain hole, the folding completed body stored in the case body can be held by the support surfaces formed by the front edge and the rear edge of the peripheral edge of the drain hole and the pressing piece over a wide range along the front and rear direction from both sides in the vehicle inside and outside direction. In this manner, the folding completed body can be stably stored in the case while preventing a folding collapse.

The folding completed body may have a substantially circular sectional shape, and the pressing piece may be configured so that a separation distance between a lower end and the case body is equal to or less than half of a diameter dimension of the folding completed body.

In the head protection airbag device having the above configuration, the gap between the lower end of the pressing piece and the case body is small, and the folding completed body can be properly prevented from protruding from the gap. In this manner, the folding collapse of the folding completed body can be further stably prevented.

What is claimed is:

1. A head protection airbag device comprising:
    an airbag configured to cover a window of a vehicle at a time of deployment and inflation, and folded and stored at an upper edge side of the window on a vehicle inner side; and
    a synthetic resin case configured to store a folding completed body of the airbag which is folded so that a lower edge side at a time of completion of inflation comes close to an upper edge side, wherein
    the case includes a case body configured to cover the folding completed body at least from a vehicle outer side to an upper surface side, and a pressing piece formed to partially protrude downward from an upper edge side of the case body and formed to cover a vehicle inner side of the folding completed body,
    the pressing piece has a band-like outer shape having a width direction substantially along a front and rear direction, and is configured to be able to press the folding completed body toward the case body so that the pressing piece can be bent with respect to the case body and the pressing piece can maintain a folded shape of the folding completed body, the pressing piece being formed substantially along a vehicle interior surface of the folding completed body,
    a drain hole for molding is formed in a region of the pressing piece disposed on a vehicle outer side in the case body, and
    a front edge side and a rear edge side of a peripheral edge of the drain hole constitute support surfaces capable of supporting the folding completed body.

2. The head protection airbag device according to claim 1, wherein
    the folding completed body has a substantially circular sectional shape, and
    the pressing piece is configured so that a separation distance between a lower end and the case body is equal to or less than half of a diameter dimension of the folding completed body.

* * * * *